United States Patent [19]
Barrier et al.

[11] Patent Number: 4,817,669
[45] Date of Patent: Apr. 4, 1989

[54] CONTROL VALVE

[75] Inventors: Miller M. Barrier; Graeme E. Reynolds; Daniel J. Pesek, all of Houston, Tex.

[73] Assignee: B.R. Controls, Inc., Houston, Tex.

[21] Appl. No.: 57,318

[22] Filed: Jun. 4, 1987

[51] Int. Cl.[4] .......................................... F15B 13/042
[52] U.S. Cl. ............................. 137/627.5; 137/236.1; 137/596.18
[58] Field of Search .............. 137/236.1, 596.18, 627.5

[56] References Cited

U.S. PATENT DOCUMENTS 4,467,833  8/1984  Satterwhite et al. .......... 251/63.4 X
4,565,349  1/1986  Tomlin .......................... 251/63.4 X
4,637,419  1/1987  Hughes ........................ 137/627.5 X Primary Examiner—Gerald A. Michalsky
Attorney, Agent, or Firm—Pravel, Gambrell, Hewitt, Kimball & Krieger

[57] ABSTRACT

A two-position, three-way subsea non-interflow valve design comprises a plug assembly. An elongated member is positioned within the valve for relative movement with respect to the plug assembly. A first seal on the plug assembly remains closed until a second seal with the elongated member circumscribes the function port. Further movement of the elongated member opens the first seal to allow flow from the supply to the function port. Two seals are presented in the flow path of the supply port to eliminate interflow to any other valve opening.

16 Claims, 3 Drawing Sheets

CONTROL VALVE

FIELD OF THE INVENTION

The field of the invention relates to subsea pilot operated valves.

BACKGROUND OF THE INVENTION

Offshore production control systems typically involve a floating production control facility. Generally speaking, a hydraulic power source is mounted on the production facility. Coupled to the hydraulic power source is a master control manifold. Multiline hoses extend from the control manifold to a control pod mounted subsea adjacent the wellhead. The control pod is used to direct movement of valves mounted adjacent the wellhead. Each wellhead valve has an actuator mounted on it. Pilot valves are frequently used between the hydraulic power supply and the actuators of wellhead valves to initiate movement of wellhead valve actuators. Commonly used in subsea hydraulic control systems are pilot valves that are three-way two-position valves.

Prior designs such as the type 80 SPM valve manufactured by Koomey, Inc. have had problems with interflow. Interflow is a leakage flow from the supply port of the pilot valve through the internals of the valve and out through the vent port. This usually occurs during shifting. The type 80 valve contained a unitary sliding cage which could selectively block off the supply port while opening the vent port of the function port. Movement of a slide off of the main seal isolating the supply port from the function port simultaneously obstructed the supply and vent ports by virtue of the sliding metal to metal fit between the cage and said supply and vent ports. Further movement of the cage resulted in a blockage of the vent port and the alignment of the supply port with the function port. This design and others similar to it were prone to some interflow especially when the cage moved slightly off the main seal between the function port and the supply port. After such initial movement, there remained only the metal to metal fit between the cage and the supply port to prevent hydraulic fluid from passing through the supply port and into the vent port.

The apparatus of the present invention presents a design to eliminate interflow by virtue of two seals isolating the supply port from the vent port. Additionally, one seal on the supply port is biased in a closed position until such time as another or shear seal can be placed in position circumscribing the function port and thus isolating the vent port from the supply port.

SUMMARY OF THE INVENTION

A two-position, three-way subsea non-interflow valve design comprises a plug assembly. An elongated member is positioned within the valve for relative movement with respect to the plug assembly. A first seal on the plug assembly remains closed until second seal with the elongated member circumscribes the function port. Further movement of the elongated member opens the first seal to allow flow from the supply to the function port. Two seals are presented in the flow path of the supply port to eliminate interflow to any other valve opening.

DETAILED DESCRIPTION OF THE PREFERRED EMBODIMENT

Figure 1:
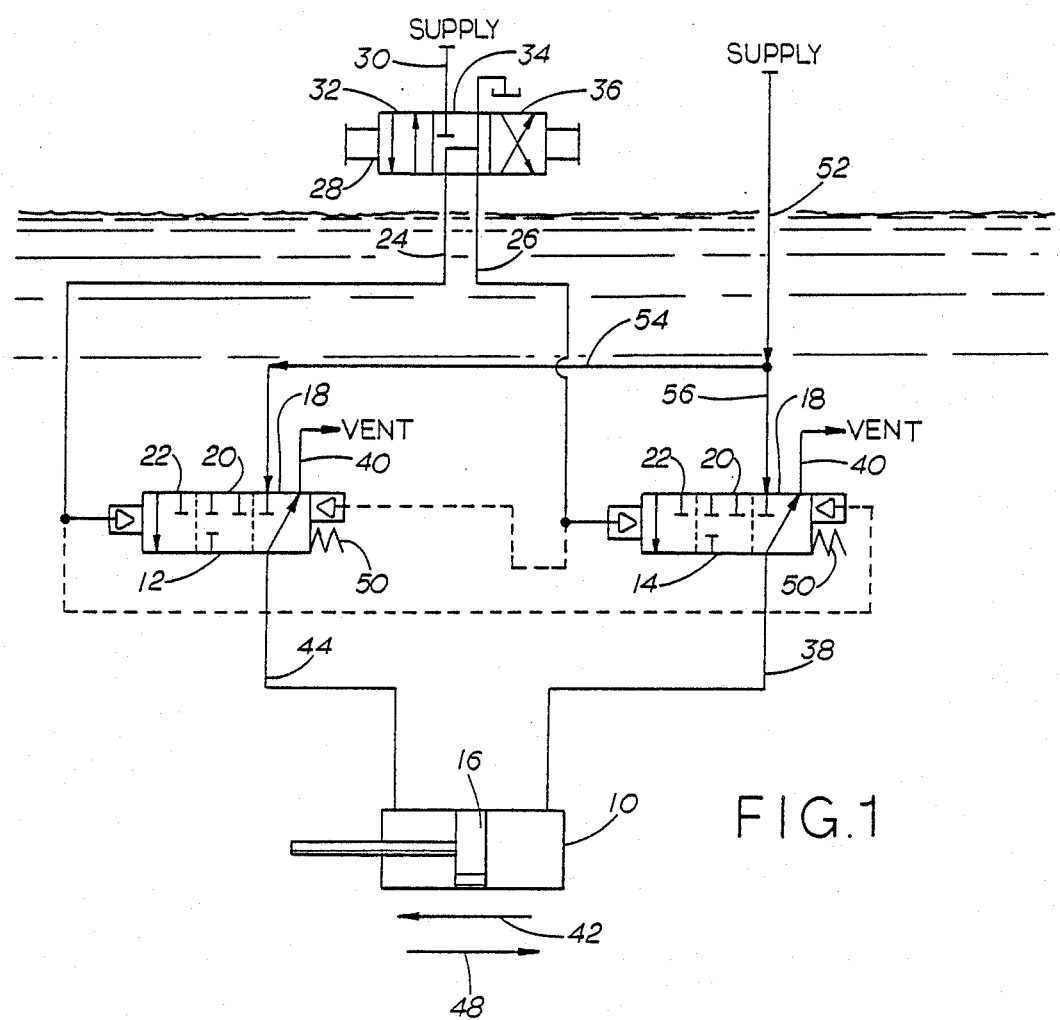
FIG. 1 contains a schematic of a typical subsea control circuit.

Referring to FIG. 1, a typical subsea control system is illustrated. A wellhead valve, not shown, typically has a valve actuator 10 mounted thereon. A pair of two position three-way valves 12 and 14 operate in tandem to move the piston 16 of valve actuator 10. Valves 12 and 14 can be placed in one of three positions: closed 18, noninterflow 20, and open 22.

As can be seen from FIG. 1, when valve 12 is in the open position 22, valve 14 is in the closed position 18 and vice versa. The noninterflow position is a transient position for both valves. Both valves 12 and 14 are pilot operated. Two pilot lines 24 and 26 extend from the surface to valves 12 and 14. A surface pilot control valve 28 selectively directs pilot pressure into line 24 or line 26 from a supply 30. Accordingly, valve 28 has three positions. The three positions are: straight through 32, closed 34, and crisscross 36. In position 32, pilot supply pressure is directed into line 24 and line 26 is vented. As a result valve 12 is placed in the open position with valve 14 in the closed position. Line 38 is therefore directed into a vent line 40 with the net result being movement of actuator 16 in the direction of arrow 48. Placement of valve 28 in the crisscross position aligns supply 30 with line 26 thereby placing valve 14 in the open position 22 while simultaneously putting valve 12 in the vent position 18. As a result, valve 12 aligns line 44 with vent line 46 and allows movement of piston 16 in the direction of arrow 42. As shown in FIG. 1, both valves 12 and 14 have a spring 50 acting to place both valves 12 and 14 in the closed position in the event of a failure in the supply 30. The main source of hydraulic supply for physically moving piston 16 is provided from hydraulic supply 52 which is connected to valves 12 and 14 by lines 54 and 56, respectively.

Figure 2:
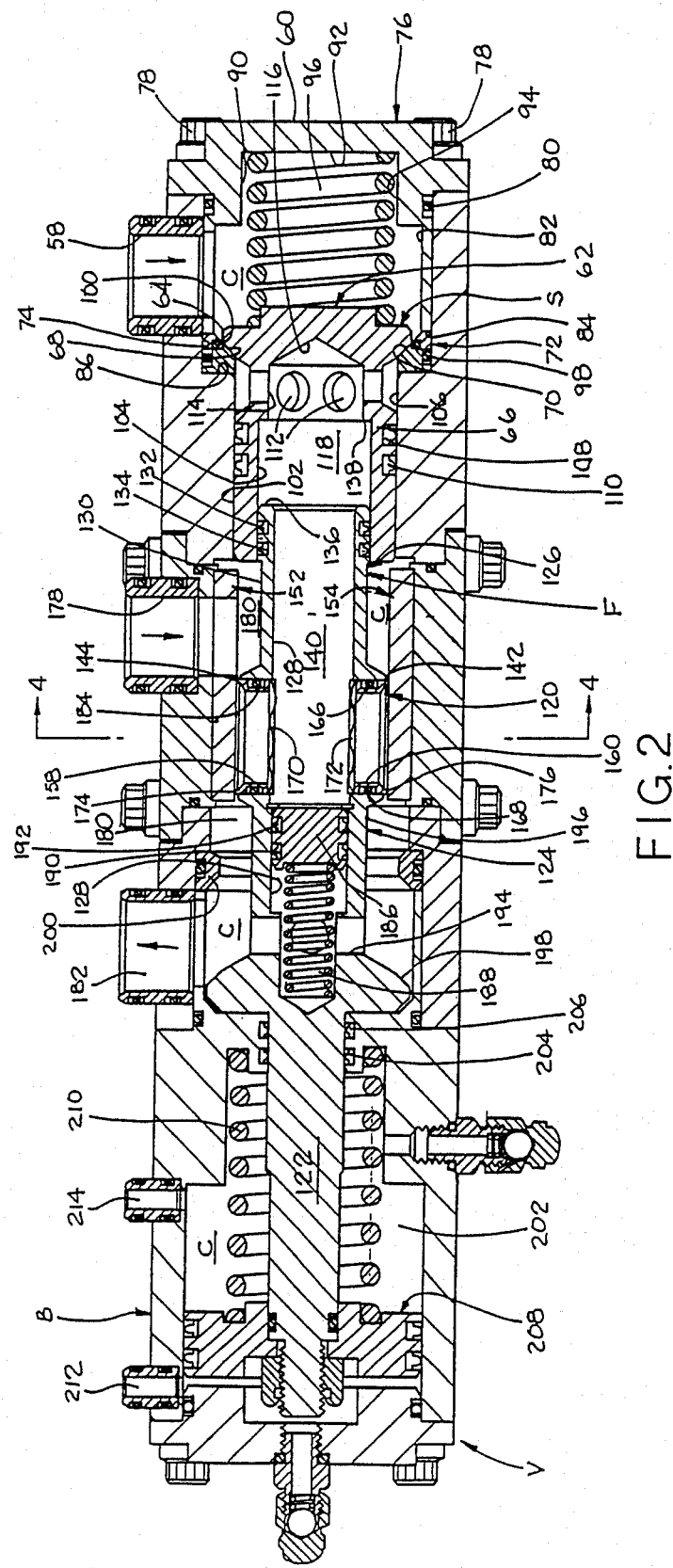
FIG. 2 illustrates a pilot valve of the present invention in the closed position.

Referring now to FIG. 2 which is a sectional view of the valves 12 or 14 illustrated in FIG. 1, the valve V includes a body B with an elongated cavity C extending longitudinally therethrough. Disposed within body B are supply sealing means S and function sealing means F. Supply sealing means S is disposed adjacent supply port 58 in body B. As shown, supply port 58 is radially oriented but can extend from the bottom 60 of body B without departing from the spirit of the invention. Supply sealing means S comprises a plug assembly 62 which further comprises: plug 64 and tubular segment 66. Plug 64 has preferably a tapered seating surface 68 which mates with surface 70 on seat 72. Seat 72 is an annular element which circumscribes the cavity and is in contact with internal wall 74 of cavity C. Valve body B has a removable bottom section 76 held to body B by bolts 78. Seal 80 prevents leakage between bottom section 76 and body B. Bottom section 76 has an annular extension segment 82 which has an upper end 84 in contact with seat 72. Accordingly, when bolts 78 secure bottom section 76 to body B, annular extension segment 82 secures seat 72 firmly in position against surface 86 in cavity C.

Bottom section 76 includes an internal depression formed by surfaces 90, 92 and 94. Biasing means in the form of a spring 96 is provided to maintain seating surface 68 in contact with seating surface 70. It is understood that alternative methods of biasing surfaces 68 and 70 together can be employed without departing from the spirit of the invention. A peripheral seal 98 is disposed between seat 72 and internal wall 74 of cavity C. A backup resilient seal 100 can be placed in seating surface 70 for contact with seating surface 68 as a secondary or backup seal to the metal-to-metal contact between surfaces 68 and 70. With surfaces 68 and 70 in firm contact as a result of the action of spring 96, flow through supply port 58 and into cavity C within body B is prevented.

Plug assembly 62 also contains tubular segment 66. Tubular segment 66 effectively extends from seating surface 68 and has an annular shape including an outer surface 102 and an inner surface 104. In the preferred embodiment tubular segment 66 is cylindrically shaped. Cavity C has a mating cylindrically-shaped wall 106 disposed adjacent to outer surface 102. Seals 108 and 110 are disposed between wall 106 and outer surface 102 for sealng therebetween.

Tubular segment 66 contains a plurality of ports 1112 to allow fluid communication from supply port 58 into a space defined by inner surface 104 and adjacent annular surface 114 as well as inclined surface 116. For the purpose of reference, such space will be referred to by number 118.

Function sealing means F includes an elongated member 120 having an upper section 122, a middle section 124 and a lower section 126. Lower section 126 is preferably cylindrically shaped having an inner surface 128 and an outer surface 130. Outer surface 130 is disposed to be in slidable, sealable contact with inner surface 104 of tubular segment 66. The sealing between surfaces 130 and 104 is accomplished by seals 132 and 134. Middle section 124 has a bottom surface 136 which engages a step 138 on tubular segment 66 upon selective movement of function sealing means F. Accordingly, relative movement is possible between lower segment 126 and tubular segment 66 until bottom surface 136 engages step 138. Thereafter further movement of function sealing means F results in displacement of plug assembly 62 by overcoming the spring force of spring 96 and separating surface 68 from surface 70. Once separation between surfaces 68 and 70 has occurred, fluid communication is established from supply port 58 through bores 112, into chamber 118, and into a chamber defined within cylindrical surface 128 hereafter referred to by 140. As seen in FIG. 2, lower segment 126 is open at its bottom thereby allowing flow communication between chamber 118 and 140.

Figure 4:
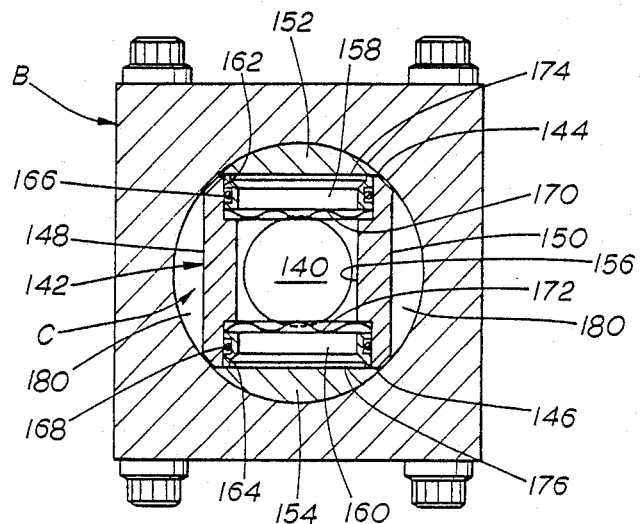
FIG. 4 is a section through lines 4—4 on FIG. 2.

Middle section 124 has a lower end 142 which has a preferably square cross-section, see FIG. 4. As shown in FIG. 4, lower end 142 comprises opposed parallel flat surfaces 144 and 146 and a second pair of parallel opposed surfaces 148 and 150.

Within the range of movement of lower end 142, cavity C has a pair of opposed flat surfaces 152 and 154. Thus, flat surface 144 is parallel and faces surface 152 while flat surface 146 is parallel to and faces surface 154. Lower end 142 preferably has a bore 156 extending therethrough from surface 144 to surface 146. As shown in FIG. 4, bore 156 is enlarged adjacent surfaces 144 and 146. Insert seals 158 and 160 are disposed in contact with cylindrical surfaces 162 and 164, respectively, (see FIG. 4). Seals 166 and 168 prevent fluid passage between insert seals 158 and 160 and their respective housing surfaces 162 and 164. Spring washers 170 and 172 bias insert seals 158 and 160, respectively into contact with surfaces 152 and 154, respectively. Thus, contact is made between sealing surface 174 on insert seal 158 and flat surface 152. Similarly, running contact is maintained between sealing surface 176 and flat surface 154. It should be noted that insert seal 160 and bore 164 are provided for the purpose of pressure balance on middle section 124 in a manner that is readily appreciated by those skilled in the art.

As seen in FIG. 2, when insert seal 158 is out of alignment with function port 178, flow communication betwen chamber 140 and function port 178 is interrupted as a result of the sealing contact between paired surfaces 174 and 152 as well as surfaces 176 and 154.

With elongated member 120 positioned as shown in FIG. 2, an axial flow path 180 is maintained between function port 178 and vent port 182 (see also FIG. 4).

Figure 3:
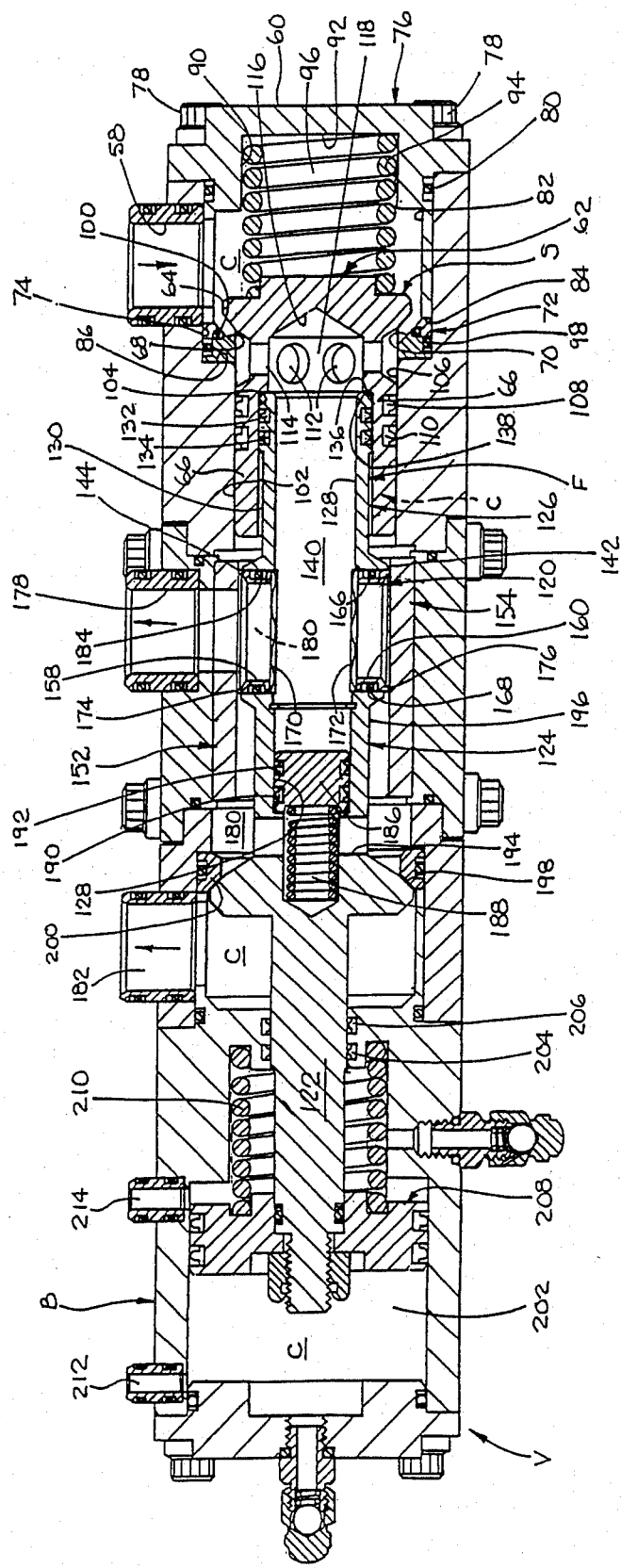
FIG. 3 illustrates the valve of the present invention in the open position.

Referring to FIG. 3, it can be seen that bore 184 in insert seal 158 has a larger diameter than function port 178. Thus, as elongated member 120 moves with respect to plug assembly 62, bore 184 comes into alignment with function port 178 as bottom surface 136 engages step 138. In this position, the volume of chamber 118 has been effectively reduced and chamber 140 is in flow communication with function port 178. At this point, there is still a sealing engagement between seating surface 68 and surface 70. However, axial flow path 180 is effectively cut off from function port 178 by virtue of sealing surface 174 circumscribing function port 178. It is only upon further movement of elongated member 120 that seating surface 68 is separated from surface 70 thereby aligning supply port 58 to function port 178. Flow can occur through supply port 58 between surfaces 68 and 70, through bores 112, through cavities 118 and 140 and into function port 178 through bore 184. It should be noted that interflow from supply port 58 to vent port 182 is eliminated by virtue of the positioning of two seals within the flow path prior to the actual initiation of flow into supply port 58. Thus, the one seal isolates the supply pressure and is disposed between surfaces 68 and 70. Another seal occurs by virtue of contact between sealing surface 174 and flat surface 152 when sealing surface 174 circumscribes function port 178. Even with the valve in the position shown in FIG. 2, there is still a seal between surfaces 68 and 70 as well as seals 108 and 110. Chamber 140 is isolated from function port 178 and vent port 182 by seals 158 and 160.

It should be noted that surfaces 152 and 154 can be removably mounted within body B as shown in FIGS. 2 and 3. Renewal of surfaces 152 and 154 may become necessary due to prolonged use.

Volume compensation is provided in chamber 140 by virtue of compensating piston 186 which is biased by spring 188. Seals 190 and 192 prevent fluid flow between piston 186 inner surface 128. As seen in comparison between FIGS. 2 and 3, movement of elongated member 120 results in compression of spring 188 coupled with displacement of compensating piston 186. Displacement of piston 186 effectively enlarges the volume of cavity 140. Fluid is displaced from above piston 186 through bores 194 and eventually out through vent port 182. It should be noted that the upper or vent segment of middle section 124 which houses piston 186 has a cylindrical outer surface 196 which is of equal or comparable diameter to outer surface 130 on lower section 126. Thus, with cylindrical surfaces 130 and 196, having a smaller diameter than the wall of the surrounding cavity C, axial flow path 180, traversing square section 142, is thereby defined.

Finally, middle section 124 includes an inclined sealing surface 198 which is positioned to selectively come in contact with inclined seat 200 effectively blocking off vent port 182 from function port 178. It should be noted that as bottom surface 136 contacts step 138, inclined sealing surface 198 is still not in contact with seat 200. However, at that time, sealing surface 174 circumscribes function port 178 and by virtue of contact with surface 152, further movement of elongated member 120 results in the position illustrated in FIG. 3 with seating surface 68 displaced from seat 70 and with inclined sealing surface 198 in contact with seat 200. This arrangement further insures against leakage into vent port 182.

Actuation of elongated member 120 is accomplished in a conventional manner. Upper section 122 of elongated member 120 is disposed in pilot subchamber 202. Seals 204 and 206 isolate pilot subchamber 202 from the remainder of cavity C by virtue of their contact with upper segment 122. A piston 208 is connected to upper section 122. Spring 210 biases piston 208 so as to maintain surfaces 68 and 70 in firm contact in the event of total hydraulic failure. Normally, hydraulic pressure is selectively applied to either ports 212 or 214 to actuate piston 208 thereby positioning elongated member 120 as necessary.

As can readily be seen, the valve of the present invention offers the advantage of having a poppet type seal between surfaces 68 and 70 as well as a shear type seal between surface 174 and 152 in the flow path between supply port 58 and function port 178. Furthermore, when surface 68 is separated from surface 70 thereby allowing supply flow into port 58, additional isolation of vent port 182 is accomplished by the contact between inclined sealing surface 198 and seal 200.

The foregoing disclosure and description of the invention are illustrative and explanatory thereof, and various changes in the size, shape and materials, as well as in the details of the illustrated construction may be made without departing from the spirit of the invention.

We claim:

1. A subsea production control valve comprising:
    a body defining a cavity therein, said body having a supply, function, and vent port in flow communication with said cavity;
    a supply sealing means in said cavity adjacent to said supply port for selective operation in two positions to open and close said supply port, said supply sealing means further comprising:
    a seat circumscribing said cavity and disposed between said supply port and said function port;
    a plug assembly mounted in said cavity with a portion thereof circumscribed by said seat, said plug assembly further comprising;
    a plug having a seating surface thereon said supply port being closed when said seating surface engages said seat; and
    a tubular segment extending from adjacent said seating surface and having an outer surface in slidable contact with said cavity wall in said body, said tubular segment means having at least one fluid passageway extending from its outer surface to an inner surface of said tubular segment, whereupon when said seating surface is displaced from said seat, flow communication is established from said supply port to within said tubular segment;
    function sealing means in said cavity, adjacent said function port, selectively operable in three positions for:
        first, opening said function port, while sealingly isolating flow communication from said supply sealing means, to allow flow communication to said vent port;
        second, isolating said function port from said vent port and aligning said function port with said supply sealing means with said supply sealing means in the closed position; and
        third, retaining said function port in alignment to allow flow communication to said supply sealing means and shifting said supply sealing means from said closed to said open position;
    said function sealing means operable from its first to its second position independent of said supply sealing means;
    whereupon initial movement of said function sealing means from said first to said second position interrupts fluid communication between said vent port and said function port and allows fluid communication between said function port and said supply sealing means,
    further movement of said function sealing means from said second to said third positions operably engages said supply sealing means to open said supply port and allow fluid communication through said cavity from said supply to said function port.

2. The valve of claim 1 wherein said function sealing means further comprises:
    an elongated member having a lower, middle and upper sections, a portion of said lower section disposed in slidable contact with said inner surface of said tubular segment of said plug assembly;
    said lower and middle sections being of tubular cross-section and having inner and outer surfaces,
    said middle section having at least one radial bore extending from its outer surface to its inner surface;
    whereupon fluid communication from said function port into said middle and lower tubular sections of said elongated member is established when said radial bore is in any part aligned with said function port.

3. The valve of claim 2 wherein:
    the cross-sectional shape of said cavity in said body adjacent said function port comprises a pair of parallel flats;
    said middle section formed having a pair of parallel flats extending over at least a portion of its outer surface;
    said function port extending into said cavity within said body through one of said flats forming said cavity;
    said radial bore in said middle section extending through at least one of said flats thereon;
    said flats of said middle section aligned with said flats in said cavity for selective positioning of said radial bore in alignment with said function port.

4. The valve of claim 3 further comprising:
    an insert seal in said radial bore of said middle section, said seal having a sealing face parallel to and extending from said flat on said middle section, said insert seal also formed having a flow port extending through said sealing surface, said sealing face in slidable contact with said flat in said cavity containing said function port, said sealing face circumscribing said function port upon selective movement of said elongated member, into said second position whereupon flow communication is established from said function port solely to within said middle and lower sections of said elongated member.

5. The valve of claim 4 further comprising:
a step adjacent said inner wall of said tubular segment of said plug assembly;
said lower section of said elongated member having an open lower end adjacent a bottom surface thereon;
said elongated member relatively moveable with respect to said plug assembly until said bottom surface contacts said step.

6. The valve of claim 5 further comprising:
biasing means within said cavity for forcing said seating surface on said plug against said seat;
said radial perforations in said tbular segment of said plug assembly disposed between said seating surface of said plug and said step within said tubular segment.

7. The valve of claim 6 wherein:
said sealing face of said insert seal in said middle section of said elongated member positioned to continually circumscribe said function port from the point when said bottom surface of said lower end of said elongated member contacts said step until said supply port is opening as a result of said elongated member overcoming said biasing means and displacing said seating surface on said plug away from said seat;
whereupon as said seating surface on said plug is displaced from said seat, flow communication is established between said supply and said function port through said radial perforations in said tubular segment and through said flow port in said insert seal in said radial bore of said elongated member.

8. The valve of claim 7 further comprising:
a vent seat circumscribing said cavity disposed axially between said flats and said vent port in said cavity;
a vent seating surface on said upper section of said elongated member to seal off said vent port when in contact with said vent seat, said contact occurring after displacement of said seating surface of said plug away from said seat to permit flow communication between said supply and function ports.

9. The valve of claim 8 wherein:
said cavity further comprises a pair of opposed arcuate surfaces axially aligned with said flats in said cavity;
said middle section of said elongated member having a quadrilaterally shaped cross-section along its portion axially aligned with said flats thereon, to create an axial flow path between said middle section and said pair of opposed arcuate surfaces in said cavity;
said lower section of said elongated member having a smaller cross-sectional area than the adjacent quadrilaterally shaped portion of said middle section to longitudinally extend said axial flow path to said function port when said lower section is in axial alignment with said function port; and said middle section having a vent segment disposed between said vent seating surface and said quadrilaterally shaped segment, said vent segment having a smaller cross-section than said quadrilaterally shaped section, to longitudinally extend said axial flow path beyond said vent seat to said vent port.

10. The valve of claim 9 further comprising:
a compensating piston slidably mounted within said vent segment;
a piston seal between the outer periphery of said piston and said inner surface of said vent segment;
said vent segment formed having at least one radial bore located between said vent seating surface and said piston to allow fluid communication between said axial flow path and said piston within said vent segment;
whereupon relative movement of said elongated member with respect to said plug assembly results in relative compensating movement between said piston and said vent segment to maintain a substantially constant volume in a flow path extending from said insert seal in said radial bore of said elongated member to said radial perforations on said plug assembly.

11. The valve of claim 10 wherein:
alignment between said sealing face on said insert seal with said function port sealingly isolates said function port from said axial flow path.

12. The valve of claim 11 further comprising:
a pilot subchamber within said cavity;
said upper section of said elongated member extending longitudinally through said pilot subchamber;
sealing means between said body and said upper section of said elongated member to prevent flow communication between said subchamber and the remainder of said cavity;
a piston connected to said upper section of said elongated member having an outer face in sealable and slidable contact with the wall defining said pilot subchamber;
biasing means in said subchamber acting on said piston to bias said insert seal out of alignment with said function port;
said body formed having a pair of pilot openings into said subchamber straddling said piston for use in actuation thereof.

13. The valve of claim 12 wherein:
said flats of said cavity are removably mounted with respect to said body for renewal thereof as a result of wear.

14. The valve of claim 13 wherein said insert seal further comprises:
a peripheral seal mounted between said insert seal and said middle section of said elongated member;
biasing means within said radial bore in said middle section for biasing said insert seal outwardly into contact with an aligned flat on said cavity.

15. The valve of claim 14 further comprising:
a backup O-ring seal in said seat disposed to contact said seating surface on said plug.

16. The valve of claim 4 further comprising:
a seal disposed between the outer surface of said tubular segment and said cavity wall;
a seal between said inner surface of said tubular segment and said outer surface of said lower section of said elongated member.

* * * * *